United States Patent Office 3,823,161
Patented July 9, 1974

---

3,823,161
AMINOTHIOPHENE DERIVATIVES
Joseph H. Lesser, Woodside, N.Y., assignor to Esso
Research and Engineering Company
No Drawing. Filed May 7, 1970, Ser. No. 35,587
Int. Cl. C07d 63/16
U.S. Cl. 260—332.2 C      9 Claims

ABSTRACT OF THE DISCLOSURE

The compounds of the subject invention are represented by the following formula

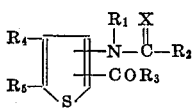

wherein $R_1$ is selected from the group consisting of hydrogen, $C_1$ through $C_8$ alkyl; $R_2$ is one selected from the group consisting of $C_1$ through $C_6$ alkyl (optionally substituted by chlorine, bromine, or cyano), $C_1$–$C_6$ alkoxy, $C_1$ to $C_6$ alkylthio, $C_1$–$C_6$ monoalkylamino, $C_2$–$C_8$ dialkylamino, phenyl (optionally substituted by chlorine, nitro, or trifluoromethyl), $C_3$–$C_8$ alkenyl, $C_3$–$C_6$ alkynyl, $C_3$–$C_8$ cycloalkyl; $R_3$ can be $C_1$ to $C_{10}$ alkoxy, $C_1$ to $C_{10}$ monoalkylamino, $C_2$–$C_{10}$ dialkylamino, phenoxy, and anilido; $R_4$ and $R_5$ can be the same or different and are selected from the group consisting of hydrogen, $C_1$ to $C_6$ alkyl, phenyl, chlorine and bromine; X is either O or S.

These compounds have been found to possess pesticidal activity and, in particular, post- and pre-emergence herbicidal activity as well as fungicidal activity.

---

This invention relates to derivatives of aminothiophenes and their use as pesticides. In one aspect, this invention relates to derivatives of substituted 3- and 2-aminothiophenes and their use as herbicides. In another aspect, this invention relates to derivatives of substituted 3- and 2-aminothiophenes and their use as fungicides.

The compounds of the subject invention are characterized by the following structural formula

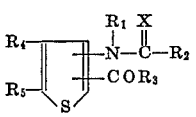

wherein $R_1$ is selected from the group consisting of hydrogen, $C_1$ through $C_8$ alkyl; $R_2$ is one selected from the group consisting of $C_1$ through $C_6$ alkyl (optionally substituted by chlorine, bromine, or cyano), $C_1$–$C_6$ alkoxy, $C_1$ to $C_6$ alkylthio, $C_1$–$C_6$ monoalkylamino, $C_2$–$C_8$ dialkylamino, phenyl (optionally substituted by chlorine, nitro, or triflurmethyl), $C_3$–$C_8$ alkenyl, $C_3$–$C_6$ alkynyl, $C_3$–$C_8$ cycloalkyl; $R_3$ can be $C_1$ to $C_{10}$ alkoxy, $C_1$ to $C_{10}$ monoalkylamino, $C_2$–$C_{10}$ dialkylamino, phenoxy, and anilido; $R_4$ and $R_5$ can be the same or different and are selected from the group consisting of hydrogen, $C_1$ to $C_6$ alkyl, phenyl, chlorine and bromine; X is either O or S.

These compounds have been found to possess pesticidal activity and, in particular, post- and pre-emergence herbicidal activity as well as fungicidal activity.

Exemplary of compounds which are encompassed by this invention are the following:

| Compound number: | |
|---|---|
| 1 | O-methyl N-3-(2-carbomethoxythienyl) carbamate. |
| 2 | O-methyl N-3-(2-carbomethoxy-5-phenylthienyl) carbamate. |
| 3 | O-isopropyl N-3-(2-carbomethoxythienyl) carbamate. |
| 4 | O-isopropyl N-3-(2-carbomethoxy-5-phenylthienyl) carbamate. |
| 5 | N-methyl-N'-3-(2-carbomethoxythienyl) urea. |
| 6 | N-methyl-N'-3-(2-carbomethoxy-5-phenylthienyl) urea. |
| 7 | O-methyl N-3-(2-carbomethoxy-5-methylthienyl) carbamate. |
| 8 | O-methyl N-3-(2-carbomethoxy-4,5-dimethylthienyl) carbamate. |
| 9 | O-methyl-N-3-(2-carbomethoxy-4,5-dichlorothienyl) carbamate. |
| 10 | N-methyl-N'-2-(3-carboethoxy-4,5-dimethylthienyl) urea. |
| 11 | O-methyl N-2-(3-carboethoxy-4,5-dimethylthienyl) carbamate. |
| 12 | O-isopropyl N-2-(3-carboethoxy-5-ethylthienyl) carbamate. |
| 13 | O-methyl N-2-(3-carboethoxy-5-phenylthienyl) carbamate. |
| 14 | N-methyl-N'-3-(2-carbanalido-5-phenylthienyl) urea. |
| 15 | N,N-dimethyl-N'-3-(2-carbomethoxy-5-phenylthienyl) urea. |
| 16 | N-allyl-N'-3-(2-carbomethoxy-5-phenylthienyl) urea. |
| 17 | N,N-diallyl-N'-3-(2-carbomethoxy-5-phenylthienyl) urea. |
| 18 | N-methyl-N'-3-(2-carbophenoxy-5-phenylthienyl) urea. |
| 19 | N,N-diallyl-N'-3-(2-carboethoxy-5-phenylthienyl) urea. |
| 20 | O-methyl N-3-(2-carbomethoxythienyl) thiocarbamate. |
| 21 | O-methyl N-3-(2-carbomethoxy-5-phenylthienyl) thiocarbamate. |
| 22 | N-methyl-N'-3-(2-carbomethoxythienyl) thiourea. |
| 23 | N,N-dimethyl-N'-3-(2-carbomethoxythienyl) thiourea. |
| 24 | N,N-dimethyl-N'-3-(2-carbomethoxy-5-phenylthienyl) thiourea. |
| 25 | O-methyl N-3-(2-carbopropoxy-4,5-dibromothienyl) carbamate. |
| 26 | N,O-dimethyl-N-3-(2-carbomethoxythienyl) urea. |
| 27 | N,O-dimethyl-N'-3-(2-carbomethoxy-5-phenylthienyl) urea. |
| 28 | N,N-dimethyl-N'-3-(2-carbomethoxythienyl) urea. |
| 29 | N,N-dimethyl-N'-3-(2-carbomethoxy-5-phenylthienyl) urea. |
| 30 | S-methyl N-3-(2-carbomethoxythienyl) thiocarbamate. |
| 31 | S-methyl N-3-(2-carbomethylthienyl) dithiocarbamate. |
| 32 | O-methyl N-3-(2-carbomethoxy-5-phenylthienyl) thiocarbamate. |
| 33 | S-methyl N-3-(2-carbomethoxy-5-phenylthienyl) dithiocarbamate. |

The foregoing compounds can be readily prepared by the following synthetic method.

The starting aminothiophene can be prepared according to the procedure outlined in British Pat. 837,086 and its preparation does not form a part of this invention.

The reactions of the aminothiophenes are set forth schematically as follows:

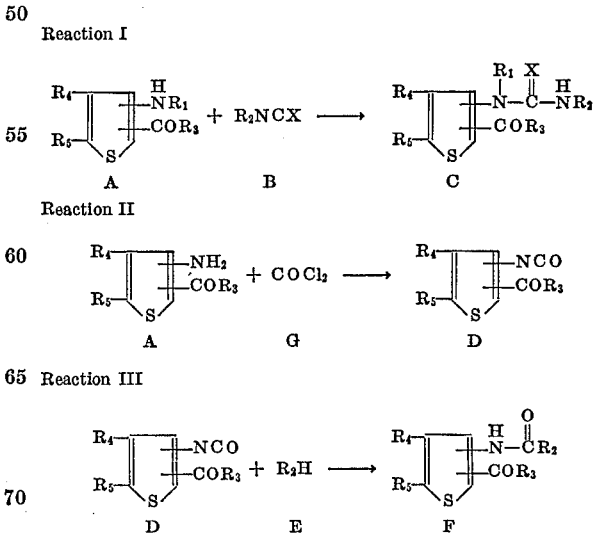

TABLE I.—REACTION I

| Concentration of reactants, mole ratio | Solvent | Temperature of reaction |
|---|---|---|
| A/B | Benzene | 20–250° |
| 1:1 to 1:3 | Chloroform | Preferred |
| | Toluene | 25–125° |
| | Ether | |
| Preferred | Hexane | |
| 1:1.1 | Dimethylformamide | |
| | Tetrahydrofuran | |
| | Preferred | |
| | Benzene | |
| | Tetrahydrofuran | |
| | Neat | |

TABLE II.—REACTION II

| Mole ratio | Solvent | Temperature |
|---|---|---|
| A/G | Benzene | −25 to +250° |
| 1:1 to 1:25 | Toluene | Preferred |
| | Preferred | −20 to +150° |
| | Toluene | |
| Preferred | | |
| 1:2 | | |

TABLE III.—REACTION III

| Mole ratio | Temperature | Solvent |
|---|---|---|
| D/E | 25–250° | Neat |
| 1:1 to 1:50 | Preferred | Benzene |
| | 25–125° | Toluene, Tetrahydrofuran |
| Preferred | | Dimethylformamide |
| 1:1.5 | | Ether, Hexane, Heptane |
| | | Preferred |
| | | Neat, Toluene |

The compounds of the invention have general herbicidal and/or fungicidal properties. They are especially useful in certain types of weed control such as, for example, in application to crop lands to give control of the common weeds, without harming the crop plants; and for the control for crabgrass in lawns.

Herbicidal and fungicidal compositions of the invention are prepared by admixing one or more of the active ingredients defined heretofore, in herbicidally or fungicidally effective amounts with a conditioning agent of the kind used and referred to in the art as a pest control adjuvant or modifier to provide formulations adapted for ready and efficient application to soil, foliage or weeds (i.e., unwanted plants) using conventional applicator equipment.

Thus, the herbicidal and fungicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The herbicidal and fungicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal and fungicidal compositions are applied either as a spray, granular or a dust to the locus or area to be treated for fungus infection or protected from undesirable plant growth, commonly called weeds, i.e., plants growing where they are not wanted. Such application can be made directly upon the locus or area of infection or the weeds thereon during the period of weed or fungus infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal and fungicidal compositions of the invention for selective weed control as in the control of weeds in cotton or corn fields, the compositions are preferably applied after planting of the crop seeds but before emergence of the seedlings. In other words, the applications are of the pre-emergence type.

The active compound is, of course, applied in an amount sufficient to exert the desired herbicidal and fungicidal action. The amount of the active compound present in the compositions as actually applied for destroying or preventing weeds will vary with the manner of application, the particular weeds for which control is sought, the purpose for which the application is being made, and like variables. In general, the herbicidal and fungicidal compositions as applied in the form of a spray, dust or granular, will contain from about 0.1% to 100% by weight of the active compound.

Fertilizer materials, other herbicidal and fungicidal agents, and other pest control agents such as insecticides and fungicides can be included in the herbicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present nitrated aryl compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, a solid grade of polystyrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horicultural petroleum spray oils boiling in the range of from about 275° to about 575° F., or boiling in the range of about 575° to about 1000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e. deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alklai metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on soil, crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrations which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/ or compositions described and claimed are prepared and/ or used.

EXAMPLE 1

Preparation of 2-Carbomethoxy-3-Isocyanato Thiophene

To a 2-liter 4-necked flask equipped with an air stirrer, gas inlet tube, thermometer, addition funnel and condenser was added the 3-amino-2-carboxymethyl thiophene, 47 g. (0.3 m.), and 500 cc. of toluene. The reaction mixture was cooled to —20° and then 1.1 equivalents of phosgene gas were added over one hour through the gas inlet tube with stirring. The reaction mixture was then heated slowly to reflux and refluxed for three hours. Then the cooled reaction mixture was placed on a rotary evaporator and the volatiles removed under reduced pressure. The residue was a brown solid, m.p. 45–54°. The infrared spectra of the solid showed a strong N=C=O band at 2250 cm.$^{-1}$ and no N—H bands indicating that the desired product was formed.

EXAMPLE 2

Preparation of 2-Carbomethoxy-3-isocyanato-5-Phenyl Thiophene

This compound was prepared according to the procedure outlined in Example 1. Its identity was confirmed by infrared spectroscopy.

EXAMPLE 3

Preparation of 2-Carbomethoxy-3-Isocyanato-5-Methyl Thiophene

This compound was prepared according to the procedure outlined in Example 1. Its identity was confirmed by infrared spectroscopy.

EXAMPLE 4

Preparation of 2-Carbomethoxy-3-Isocyanato-4-Methyl Thiophene

This compound was prepared according to the procedure outlined in Example 1. Its identity was confirmed by infrared spectroscopy.

EXAMPLE 5

Preparation of 2-Carbomethoxy-3-Isocyanato-4-Methyl Thiophene

This compound was prepared according to the procedure outlined in Example 1. Its identity was confirmed by infrared spectroscopy.

EXAMPLE 6

Preparation of O-Methyl-N-3-(2-Carbomethoxythienyl) Carbamate

To a 250 cc. flask equipped with a thermometer and condenser was added 9.1 g. (0.05 m.) of 2-carbomethoxy-3-isocyanato thiophene and 50 cc. of methyl alcohol. The reaction mixture was then refluxed for 1 hour, allowed to cool to 25° and the volatiles removed under reduced pressure. The residue, a brown solid, m.p. 73–80°, was crystallized from ether, m.p. 84.5–86°.

*Analysis.*—Calculated: C, 44.83; H, 3.76; N, 6.54. Found: C, 44.79; H, 4.49; N, 6.85.

EXAMPLE 7

Preparation of O-Isopropyl N-3-(2-Carbomethoxythienyl) Carbamate

This compound was prepared according to the procedure in Example 6 except that isopropanol was used in the preparation of the isopropyl carbamates.

*Analysis.*—Calculated: C, 53.92; H, 4.90; N, 5.24. Found: C, 49.56; H, 5.40; N, 5.67.

EXAMPLE 8

Preparation of O-Methyl N-3-(2-Carbomethoxy-5-Methylthienyl) Carbamate

This compound was prepared according to the procedure of Example 6.

*Analysis.*—Calculated: C, 47.14; H, 4.83; N, 6.10. Found: C, 47.44; H, 5.03; N, 6.29.

EXAMPLE 9

Preparation of O-Isopropyl N-3-(2-Carbomethoxy-5-Methylthienyl) Carbamate

This compound was prepared according to the procedure of Example 6 except that isopropanol was used in the preparation of the isopropyl carbamates. The structure was confirmed by IR and NMR.

EXAMPLE 10

Preparation of O-Methyl N-3-(2-Carbomethoxy-4-Methylthienyl) Carbamate

This compound was prepared according to the procedure of Example 6.

EXAMPLE 11

Preparation of O-Isopropyl N-3-(2-Carbomethoxy-4-Methylthienyl) Carbamate

This compound was prepared according to the procedue of Example 6 except that isopropanol was used in the preparation of the isopropyl carbamates. The structure was confirmed by IR and NMR.

EXAMPLE 12

Preparation of O-Methyl N-3-(2-Carbomethoxy-5-Phenylthienyl) Carbamate

This compound was prepared according to the procedure of Example 6. The structure was confirmed by IR and NMR.

EXAMPLE 13

Preparation of O-Isopropyl N-3-(2-Carbomethoxy-5-Phenylthienyl) Carbamate

This compound was prepared according to the procedure of Example 6 except that isopropanol was used in the preparation of the isopropyl carbamates.

*Analysis.*—Calculated: C, 60.16; H, 5.36; N, 4.38. Found: C, 59.86; H, 5.21; N, 5.62.

EXAMPLE 14

Preparation of O-Methyl N-3-(2-Carbomethoxy-5-Ethylthienyl) Carbamate

This compound was prepared according to the procedure of Example 6 The structure was confirmed by IR and NMR.

EXAMPLE 15

Preparation of O-Methyl N-3-(2-Carbomethoxy-5-Ethylthienyl) Carbamate

This compound was prepared according to the procedure of Example 6 except that isopropanol was used in the preparation of the isopropyl carbamates. The structure was confirmed by IR and NMR.

EXAMPLE 16

Preparation of N,N-Dimethyl-N'-3-(2-Carbomethoxythienyl) Urea an air stirrer, thermometer, gas inlet tube, and condenser was added 14.0 g. (0.075 m.) of 1-carbomethoxy-2-isocyanato thiophene and 125 cc. of benzene. An excess of dimethylamine gas was then bubbled into the reaction solution. After nitrogen sparging the volatiles were removed under reduced pressure leaving 15.1 g. of brown solid product which was recrystallized from ether, m.p. 129.5–131.5°.

*Analysis.*—Calculated: C, 47.35; H, 5.30; N, 12.27. Found: C, 47.65; H, 5.19; N, 12.14.

EXAMPLE 17

Preparation of N,N-Dimethyl-N'-(2-Carbomethoxy-5-Methylthienyl) Urea

The compound was prepared according to the procedure outlined in Example 16. The structure was confirmed by IR and NMR.

EXAMPLE 18

Preparation of N,N-Dimethyl-N'-(2-Carbomethoxy-4-Methylthienyl) Urea

The compound was prepared according to the procedure outlined in Example 16. The structure was confirmed by IR and NMR.

EXAMPLE 19

Preparation of N,N-Dimethyl-N'-3-(2-Carbomethoxy-5-Phenylthienyl) Urea

This compound was prepared according to the procedure outlined in Example 16. The structure was confirmed by IR and NMR.

EXAMPLE 20

Preparation of N,N-Dimethyl-N'-3-(2-Carbomethoxy-5-Ethylthienyl) Urea

The compound was prepared according to the procedure outlined in Example 16. The structure was confirmed by IR and NMR.

EXAMPLE 21

Preparation of N-Methyl-N'-3-(2-Carbomethoxythienyl) Urea

To 5.8 g. (0.04 m.) of 3-amino-2-carbomethoxy thiophene dissolved in 50 cc. of benzene was added 2.9 g. (0.04 m.) of methyl isocyanate. The reaction solution was refluxed for 1 hour and then all volatiles were removed under reduced pressure. The residue, a light brown solid, was recrystallized from benzene/petroleum ether, m.p. 117–118.5°.

*Analysis.*—Calculated: C, 44.81; H, 4.62; N, 12.83. Found: C, 45.33; H, 4.83; N, 13.48.

EXAMPLE 22

Preparation of N-Methyl-N'-3-(2-Carbomethoxy-5-Methylthienyl) Urea

The compound was prepared according to the procedure outlined in Example 21.

*Analysis.*—Calculated: C, 47.34; H, 5.30; N, 12.27. Found: C, 46.95; H, 4.70; N, 12.08.

EXAMPLE 23

Preparation of N-Methyl-N'-3-(2-Carbomethoxy-4-Methylthienyl) Urea

The compound was prepared according to the procedure outlined in Example 21.

*Analysis.*—Calculated: C, 47.34; H, 5.30; N, 12.27. Found: C, 47.43; H, 5.35; N, 12.44.

EXAMPLE 24

Preparation of N-Methyl-3-(2-Carbomethoxy-5-Phenylthienyl) Urea

The compound was prepared according to the procedure outlined in Example 21. The structure was confirmed by IR and NMR.

EXAMPLE 25

Preparation of N,N-Dimethyl-N'-3-(2-Carbomethoxy-4,5-Dichlorothienyl) Urea

To a vigorously strring mixture of 6.0 g. (0.026 m.) of 2-carbomethoxy-3-(N,N-dimethylureido) thiophene in 25 cc. of chloroform was added 7.0 g. (0.05 m.) of sulfuryl chloride. The addition required 1.5 hours and then the reaction mixture was allowed to stir for one hour. At the end of this time all volatiles were removed under aspirator vacuum and the residue taken up in 50 cc. $CHCl_3$. The chloroform solution was washed with 20 cc. $H_2O$ and 20 cc. 5% aqueous bicarbonate. The chloroform solution was then dried over sodium sulfate, filtered and all volatiles removed under reduced pressure. The residue, a yellow solid, wt. 6.2 g., was crystallized from ether, m.p. 160–163°.

*Analysis.*—Calculated: C, 36.37; H, 3.39; N, 9.42. Found: C, 36.58; H, 3.29; N, 9.70.

EXAMPLE 26

(Pre-Emergence)

Representative amino thiophene derivatives from those prepared in the previous examples were evaluated for pre-emergence herbicidal activity in this example. The test procedure employed was as follows:

Two flats seeded with six crops (cotton, soybean, alfalfa, corn, rice and oats) and six weeds (mustard, morning glory, crabgrass, foxtail, barnyard grass and zinnia) were sprayed with a formulation containing the test chemical at the rate given in Table IV. The test chemicals were sprayed as acetone solutions or very small particle acetone suspensions onto the test plants. Sprayers were calibrated to deliver a certain volume of liquid and the calculated amount of active ingredient which would give a rate corresponding to the indicated lbs./acre. The flats were then held in the greenhouse and a response rated after 12 days to 16 days. Response was rated by a scale of 0–10. The 0–10 scale is defined as: O=no injury; 1–3=slight injury; 4–6=moderate injury, plants may die; 7–9=severe injury, plants will probably die; 10=all plants dead (complete kill). Results of this test are shown below in Table IV and it is indicative that many of these compounds show a high degree of herbicidal activity against certain weed species, yet remain highly tolerant of desirable crop species.

TABLE IV.—PRE-EMERGENCE HERBICIDAL DATA

| Name of compound | Rate, lbs./a. | Barnyard grass | Crab grass | Foxtail | Zinnia | Mustard | Morning glory | Cotton | Soybean | Alfalfa | Corn | Rice | Oats |
|---|---|---|---|---|---|---|---|---|---|---|---|---|---|
| N-methyl-N'-3-(2-carbomethoxythienyl) urea | 5 | 8 | 8 | 8 | 5 | 4 | 3 | 0 | 0 | 2 | 0 | 0 | 0 |
| O-methyl N-3-(2-carbomethoxy-5-methylthienyl) carbamate | 10 | 1 | 1 | 1 | 8 | 7 | 6 | 0 | 0 | 0 | 0 | 0 | 0 |

EXAMPLE 27

Post-Emergence)

In this example representative derivatives of the compounds of this invention were evaluated for post-emergence activity. The test procedure was as follows:

Flats were seeded, as described in the previous example, and held until the first true leaves had appeared on all plants, which were then sprayed in the same fashion as in the preceding example at the rate in lbs./acre given in Table V. The plant responses were rated 12-16 days after treatment on the same scales as described previously. The test results are shown in Table V.

TABLE VII

Effectiveness of Several Aminothiophene Derivatives Against a Soil Fungus

Rate—100 lbs./a.
vs. Sclerotium

| Name of compound: | Rating [1] |
|---|---|
| N-methyl-N'-3-(2-carbomethoxythienyl) urea | 9 |
| O-isopropyl - N-3-(2-carbomethoxythienyl) carbamate | 5 |
| O-methyl-N - 3 - (2-carbomethoxythienyl) carbamate | 9 |
| N-methyl - N - methoxy - N'-3-(2-carbomethoxythienyl) urea | 5 |
| N,N-dimethyl-N'-3-(2-carbomethoxy-5 - methyl-thienyl) urea | 7 |
| O-methyl-N-3-(2 - carbomethoxy - 4 - methyl-thienyl) carbamate | 9 |
| O-isopropyl-N-3-(2 - carbomethoxy - 4 - methyl-thienyl) carbamate | 9 |
| O - methyl - N - 3 - (2 - carbomethoxy-4,5-dichlorothienyl) carbamate | 10 |
| N,N-dimethyl-N-3-(2 - carbomethoxy-4,5-dichlorothienyl) urea | 5 |

[1] Wherein 0=no control and 10=complete control of the test spores.

TABLE V.—POST-EMERGENCE HERBICIDAL DATA

| Name of compound | Rate, lbs./a. | Barnyard grass | Crab grass | Foxtail | Zinnia | Mustard | Morning glory | Cotton | Soybean | Alfalfa | Corn | Rice | Oats |
|---|---|---|---|---|---|---|---|---|---|---|---|---|---|
| N-methyl-N'-3-(carbomethoxythienyl) urea | 2.5 | 10 | 10 | 10 | 10 | 10 | 3 | 2 | 3 | 9 | 1 | 2 | 3 |
| N,N-dimethyl-N'-3-(2-carbomethoxythienyl) urea | 10 | 8 | 10 | 8 | 10 | 10 | 9 | 3 | 9 | 9 | 3 | 4 | 4 |
| O-methyl N-3-(2-carbomethoxythienyl) carbamate | 10 | 2 | 3 | 3 | 8 | 10 | 7 | 0 | 0 | 1 | 0 | 0 | 0 |

EXAMPLE 28

In this example, representative compounds of this invention were evaluated for bean powdery mildew fungus activity. The test procedure was as follows:

Tender green bean plants with fully expanded primary leaves are inoculated with spores of the powdery mildew fungus (*Erysiphe polygoni*) 48 hours prior to application of test chemicals. Chemicals are applied at the concentrations (p.p.m.) given in Table VI. After the spray has dried, the plants are removed to the greenhouse and held for a period of 7–10 days, at the end of which time the amount of mildew on the primary leaves is rated.

TABLE VI.—EFFECTIVENESS OF SEVERAL 5-PHENYL-THIOPHENE DERIVATIVES AGAINST BEAN MILDEW

| | Rate | | |
|---|---|---|---|
| Name of compound | 100 p.p.m. | 20 p.p.m. | 4 p.p.m. |
| N-methyl-N'-3-(2-carbomethoxy-5-phenyl-thienyl) urea | 9 | 8 | 7 |
| O-isopropyl N-3-(2-carbomethoxy-5-phenyl-thienyl) carbamate | 10 | 9 | 4 |
| O-methyl N-3-(2-carbomethoxy-5-phenyl-thienyl) carbanate | 10 | 10 | 5 |
| N,N-dimethyl-N'-3-(2-carbomethoxy-5-phenylthienyl) urea | 10 | 9 | 5 |

EXAMPLE 29

In this example, representative compounds of this invention were evaluated for soil fungicidal activity. The test procedure was as follows:

Soil Fungicide Tests

Separate lots of sterilized soil are inoculated with *Sclerotium rolfsii*. The inoculated soil is placed in four-ounce Dixie cups and two cups for each organism are drenched with 30 ml. of a formulation containing sufficient chemical to give dosage rates enumerated in Table VII. The treated cups are incubated for two days at 70° F. The amount of mycelial growth on the soil surface is then rated. The test results are shown in Table VII.

What is claimed is:

1. A compound of the formula

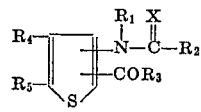

wherein $R_1$ is selected from the group consisting of H, $C_1$–$C_8$ alkyl; $R_2$ is $C_1$–$C_6$ alkoxy; $R_3$ is selected from the group consisting of $C_1$–$C_{10}$ alkoxy and phenoxy; $R_4$ and $R_5$ are independently selected from the group consisting of hydrogen, $C_1$–$C_6$ alkyl, phenyl, chlorine or bromine; X is oxygen.

2. A compound according to claim 1, O-methyl-N-3-(2-carbomethoxythienyl) carbamate.

3. A compound according to claim 1, O-isopropyl N-3-(2-carbomethoxythienyl) carbamate.

4. A compound according to claim 1, O-methyl N-3-(2-carbomethoxy-5-methylthienyl) carbamate.

5. A compound according to claim 1, O-isopropyl N-3-(2-carbomethoxy-5-methylthienyl) carbamate.

6. A compound according to claim 1, O-methyl N-3-(2-carbomethoxy-4-methylthienyl) carbamate.

7. A compound according to claim 1, O-isopropyl N-3-(2-carbomethoxy-4-methylthienyl) carbamate.

8. A compound according to claim 1, O-methyl N-3-(2-carbomethoxy-5-phenylthienyl) carbamate.

9. A compound according to claim 1, O-isopropyl N-3-(2-carbomethoxy-5-phenylthienyl) carbamate.

References Cited

UNITED STATES PATENTS

| | | | |
|---|---|---|---|
| 3,393,224 | 7/1968 | Brookes et al. | 260—471 |
| 3,515,744 | 6/1970 | Steinbrunn et al. | 260—471 |

OTHER REFERENCES

Takaya et al.: Bull. Chem. Soc., Japan, 1968, 41(10), 2532–4.

Takaya et al.: Bull. Chem. Soc., Japan, 1968, 41(9), 2176–7.

HENRY R. JILES, Primary Examiner

C. M. S. JAISLE, Assistant Examiner

U.S. Cl. X.R.

71—3, 90